United States Patent

Maiocchi

[15] 3,703,202

[45] Nov. 21, 1972

[54] TREAD RING FOR REMOVABLE TREAD TIRES

[72] Inventor: Luigi Maiocchi, Milan, Italy
[73] Assignee: Industrie Pirelli S.p.A., Milan, Italy
[22] Filed: March 3, 1971
[21] Appl. No.: 120,653

[30] Foreign Application Priority Data

March 12, 1970 Italy..............................21827

[52] U.S. Cl. ....................152/175, 152/187, 152/361
[51] Int. Cl. ..............................................B60c 11/02
[58] Field of Search........152/175, 179, 187, 191, 361

[56] References Cited

UNITED STATES PATENTS 3,557,858  1/1971  Lugli..........................152/187

Primary Examiner—Drayton E. Hoffman
Attorney—Stevens, Davis, Miller & Mosher

[57] ABSTRACT

A tread ring for removable tread tires which is provided with a tension-resistant armor formed by a helically wound metal cord having coils disposed substantially parallel to the mid-circumferential plane of the tire. This structure is provided with layers disposed radially inwardly and outwardly of the armor. The layers embody metal cords disposed parallel to one another in each layer and extend along two directions crossed relative to the mid-circumferential plane of the tire. The ratio between tensile strength of the layers and the armor is greater than 0.3 and less than 1.

2 Claims, 4 Drawing Figures

PATENTED NOV 21 1972 3,703,202

INVENTOR
LUIGI MAIOCCHI

BY
Stevens, Davis, Miller & Mosher
ATTORNEYS

TREAD RING FOR REMOVABLE TREAD TIRES

The present invention relates to pneumatic tires in which the tread is separable from the carcass, and, more particularly, it relates to those types of tires in which the joining of the tread to the carcass is obtained through friction forces generated by the inflation pressure of the tire assembly.

In the field of the above-described tires, several types of tread rings containing an assembly of reinforcing structures are already known. These comprise a tension-resistant armor constituted by a single helically wound metal cord, whose coils are disposed in a direction substantially parallel to the direction of the mid-circumferential plane of the tire, and two additional layers of metal fabric, whose cords, parallel to one another, are disposed along two directions crossed with respect to said plane.

The tension-resistant armor has the task of withstanding expansion of the carcass, in order to produce the friction forces which secure the tread ring on the carcass itself.

The two additional layers which, with respect to the armor, may take different positions (both in a radially outer position or in a radially inner position, or one in a radially inner position and the other in a radially outer position), depending upon the desired characteristics to be imparted to a selected tire, and they also have the effect of imparting to the tire the necessary transverse rigidity which gives it good road holding ability.

However, depending upon the position they take with respect to the armor, the additional layers fulfill other tasks, as those of protecting the armor against punctures and ruptures due to impacts; of allowing appropriate distribution of concentrated stresses on a wider portion of the tread; of improving the drift characteristics; of maintaining in ordered arrangement the coils of the armor during the manufacture of the ring; of preventing, in particularly severe service conditions, the possibility the coils may cut the underlying layer of rubber; and other tasks.

In conventional rings, the armor cords are much larger than those of the additional layers, and this is because the armor is subjected to higher stresses. For instance, the cord used for the armor may have a 7(7×3)/0.15 formation, and a diameter of 2.7 mm., whereas in the additional layers, the cord may have a 7×3/0.15 formation and a diameter of 0.9 mm. As is known to those skilled in the art, the expression "7×3/0.15" formation means a metal cord constituted by three strands of three wires each, the diameter of each wire being 0.15 mm., while the expression "7(7×3)/0.15" means a cord formed by seven strands of the above-defined type.

The results obtained with the above-described tread rings are quite satisfactory, in particular as regards their flexibility and consequently their comfort.

However, the present invention aims at further improving the rings in respect of the fatigue resistance of the reinforcing structure in its entirety, without changing the flexibility characteristics of the ring.

The object of the invention is, therefore, a tread ring for removable tread tires, which comprises a tension-resistant armor formed by a helically wound metal cord whose coils are disposed in a direction substantially parallel to the mid-circumferential plane of the tire and comprises, moreover, two additional layers of metal cords parallel to one another in each layer and disposed along two directions crossed with respect to the mid-circumferential plane, and characterized in that the ratio between the tensile strength of each of the two additional layers and the tensile strength of the armor is greater than 0.3 and less than 1.

As in the reinforcing structures used in pneumatic tires, the resistant elements are substantially constituted by cords embedded in the rubber, in the present application the tensile strength is considered as applied in the longitudinal direction of said cords, and it is always referred to a unitary width (for instance, 1 cm.) measured perpendicularly in respect of the direction of the cords of each of the layers constituting the reinforcing structure (armor or additional layers).

The so defined tensile strength constitutes a parameter which summarizes various partial indexes concerned with fatigue resistance, as the elastic modulus of the material, the diameter of the cords and the thickness of the cords (the term "thickness" meaning the number of cords comprised in a unitary width of the layers).

From the many tests carried out, it was surprisingly ascertained that the ratio between the tensile strength of each of the two additional layers and the tensile strength of the armor is of particular significance in order to obtain an improvement in the fatigue resistance of the tread ring without making its flexibility characteristics worse.

In fact, for values of such ratio greater than 1, the flexibility of the reinforcing structure is considerably worsened, while for values less than 0.3 premature ruptures of the same, due to fatigue stresses, can take place.

This is probably due to the fact that, when the cords of the additional layers take dimensions greater than the cords of the armor, they are oversized with respect to the stresses they must withstand, and the immediate result is that of producing an excessive radial rigidity which, besides being not required, is prejudicial in respect of the travelling comfort of the vehicle.

Analogous results would be obtained by considering the thickness of the cords of the additional layers.

The reason a ratio less than 0.3 does not provide adequate fatigue behavior to the entire structure is not completely clear; it is to be probably attributable to the fact that, if the cords of the additional layers are much smaller than those of the armor, they are unable to withstand the transverse stresses generated during the tire service, thus giving rise to premature ruptures, with negative consequences on the tire life.

Moreover, as a fraction of these stresses is necessarily discharged on the armor (owing to the insufficient resistance of the additional layers), the latter will be subjected to stress (in the transverse direction) for which it is not devised. Thus, there is also the risk of analogous premature ruptures for the cords of the armor.

According to a preferred embodiment of the invention, the ratio between the tensile strength of each of the additional layers and the tensile strength of the armor ranges between 0.4 and 0.75.

The present invention will now be better illustrated with reference to the attached drawings, given by way of non-limiting examples, in which.

Figure 1:
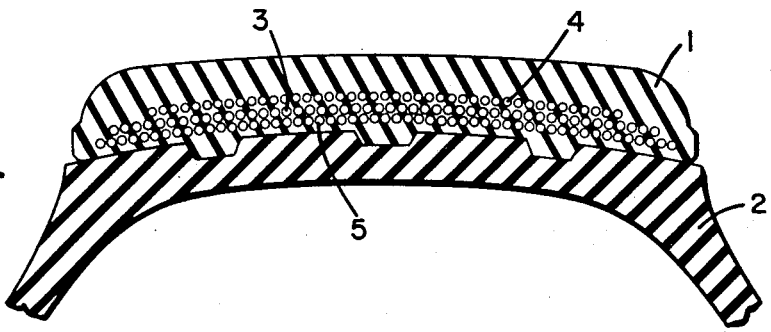
FIG. 1 is a section of a tread ring according to the invention.
Figure 2:
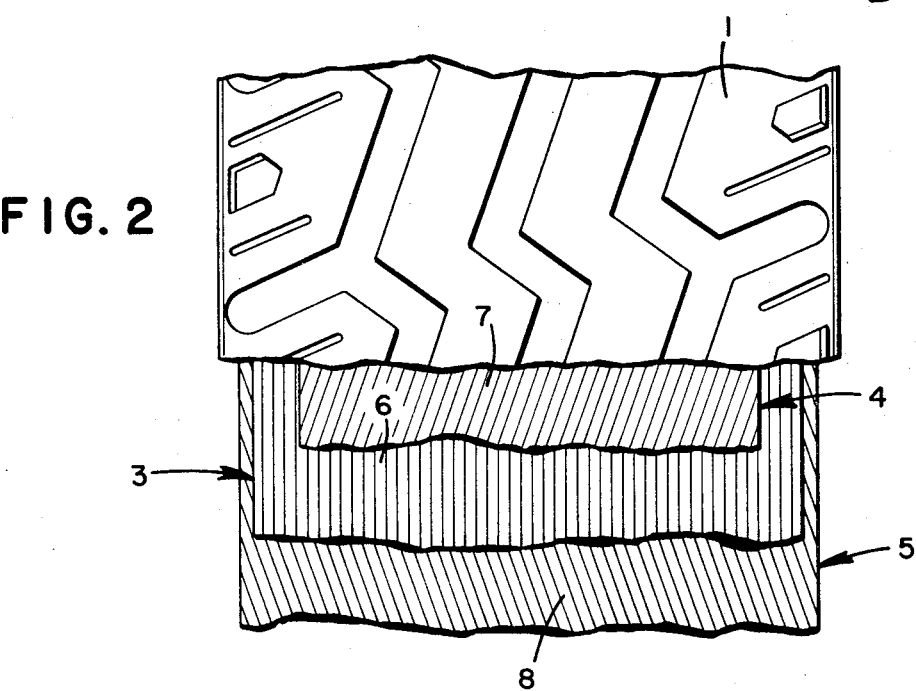
FIG. 2 is a plan view of the tread ring of FIG. 1 with parts broken away to show the arrangement of the cords.

FIGS. 1 and 2 represent a removable tread tire, comprising a tread ring 1 and a carcass 2.

The reinforcing structure of the ring is constituted by an armor 3, by an additional layer 4 disposed in a radially outer position with respect to said armor and by an additional layer 5 disposed in a radially inner position, always with respect to the armor.

The armor 3 is constituted by a helically wound metal cord 6 whose coils are disposed in a direction substantially parallel to the direction of the mid-circumferential plane of the tire.

The additional layer 4, disposed radially outwardly with respect to the armor 3, is formed by metal cords 7, parallel to one another and inclined at an angle of 20° with respect to the mid-circumferential plane of the tire.

The additional layer 5, disposed radially inwardly with respect to the armor 3, is formed by metal cords 8, parallel to one another, inclined at an angle of 20° with respect to the mid-circumferential plane of the tire, and in a direction opposite to that of the cords of the additional layer 4.

Figure 3:
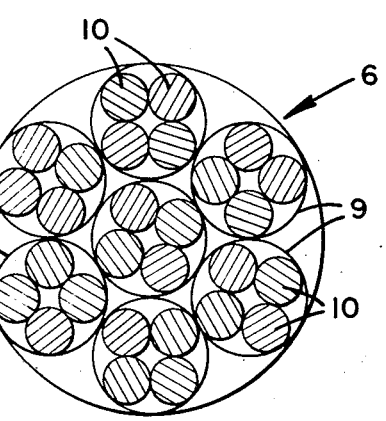
FIG. 3 shows in cross section a cord for the armor.

FIG. 3 shows on an enlarged scale the cross section of the cord 6, used for the armor 3. This cord has a 7×4/0.22 formation; namely, is formed by seven strands 9, each strand 9 being formed by four wires 10, each of which has a diameter of 0.22 mm.

Figure 4:
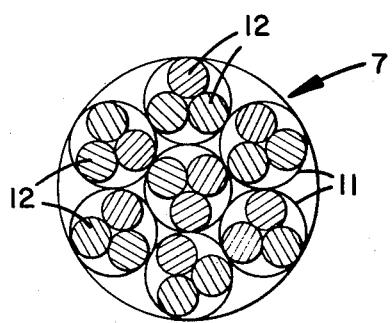
FIG. 4 represents in cross section a cord for the additional layers.

FIG. 4 shows on an enlarged scale the cross section of the cords 7 and 8, respectively used for the additional layers 4 and 5. This cord has a 7×3/0.18 formation; namely, is formed by seven strands 11, each strand 11 being formed by three wires 12, each of which has a diameter of 0.18 mm.

The armor 3, formed by the cords 6, has a thickness of five cords/cm., while the additional layers 4 and 5, formed by the cords 7 and 8, respectively, have a thickness of six cords/cm.

As a single cord constituting the armor 3 has a tensile strength of 280 Kg, the tensile strength per width unit of the armor is 280 × 5; namely, 1400 Kg/cm.

Likewise, as a single cord of each additional layer has a tensile strength of 122 Kg, the tensile strength per width unit of each additional layer is 122 × 6; namely, 732 Kg/cm (these values being rounded off to the unit).

By making a ratio between the tensile strength — referred to the width unit — of each additional layer and that of the armor, the following value 732/1400 = 0.523 is obtained.

To evaluate the performance obtainable from the rings according to the present invention, two sets of 11.00–20 size tires were produced and tested in close comparison. The first set was provided with conventional tread rings, while the second was provided with tread rings according to the present invention. The same type of carcass was used for all of these tires.

More precisely, the resistant elements of the tested rings were made as follows:

CONVENTIONAL RINGS

Armor = cord = 7(7×3)/0.15
  thickness of the armor = 2.86 cords/cm
  tensile strength per width unit = 1,800 Kg/cm
Each additional layer = cord = 7×3/0.15
  thickness of the layer = 4 cords/cm
  tensile strength per width unit = 360 Kg/cm Ratio between tensile strength of each additional layer and tensile strength of the armor = 360/1,800 = 0.2

RINGS ACCORDING TO THE INVENTION

Armor = cord = 7×4/0.22
  thickness of the armor = 5 cords/cm
  tensile strength per width unit = 1,400 Kg/cm
Each additional layer = cord = 7×3/0.18
  thickness of the layer = 6 cords/cm
  tensile strength for width unit = 732 Kg/cm Ratio between tensile strength of each additional layer and tensile strength of the armor = 732/1,400 = 0.523

As regards the fatigue resistance of the resistant structure, both types of tires were subjected, under the same conditions, to particularly severe tests, intended to show their fatigue resistance.

The tires provided with conventional tread rings lasted for 15,000 Km and showed at the end of the test manifest ruptures of the additional layers of the tread ring, while the tires provided with tread rings according to the invention, after 25,000 Km, did not show any trace of fatigue.

Obviously, these values are to be referred only to the severe conditions of the test to which the tires were subjected, and are, therefore, to be considered as mere comparison indexes. The tires in normal service conditions would have lasted for a considerably longer mileage.

As regards the radial flexibility of the resistant structure, each type of tire was subjected to squeezing against a plane, by interposing between said plane and the tire a metal body having a surface shaped as a semisphere of a 60 mm diameter, disposed in the central portion of the tread ring, and having its convexity directed towards the tread ring.

In these conditions the tire tread deforms taking a considerable concavity in correspondence of the semisphere, which decreases gradually towards the surface of the surrounding plane.

At the peripheral portion of the semisphere the tread cannot touch said plane, so that around the semisphere there will be a zone or area on which no impression of the tread can be noticed.

Since, at equal conditions of squeezing load, the width of this area varies depending upon the variation in the rigidity of the reinforcing structure of the tread ring, the value of the area can constitute an index of the flexibility of the ring itself.

Therefore, after having assumed a pre-established deformation of the tread, measured from the value of the area surrounding the semisphere and not concerned with the tread impression, it was noted that, to reach such deformation, the tires provided with conventional rings and inflated at a pressure of 7 Kg/cm$^2$ required a load of 1,610 Kg, while the tires provided with tread rings according to the present invention required a load of 1,545 Kg. This demonstrates that the radial flexibility of the two types of tread rings is practically equal, with a certain margin in favor of those according to the invention.

Subsequent tests of practical behavior on roads gave the same results as regards comfort, confirming moreover a high margin of fatigue resistance in favor of the tires provided with rings of the new type.

During these tests, a relevant reduction in the tread wear was surprisingly noticed in favor of the tires provided with tread rings according to the present invention.

This is probably due to the fact that the additional layers of these rings, which better resist the transverse stresses of the tire in service, permit only a limited mobility of the tread blocks, with a consequent reduced creeping of the same on the ground and with the resultant minor wear.

It is understood that the above reported examples have no limiting character and that the present invention includes any other alternative embodiment based on the above indicated inventive concept and the following claims.

What is claimed as new is:

1. A tread ring for removable tread tires, having a tension-resistant armor formed by a helically wound metal cord, the coils of which are disposed in a direction substantially parallel to the mid-circumferential plane of the tire, and comprising two additional layers of metal cords parallel to one another in each layer and disposed along two directions crossed with respect to the mid-circumferential plane, characterized in that the ratio between the tensile strength of each of the two additional layers and the tensile strength of the armor is greater than 0.3 and less than 1.

2. A tread ring as in claim 1, characterized in that the range of said ratio is between 0.4 and 0.75.

* * * * *